(12) United States Patent
Kwon et al.

(10) Patent No.: US 10,587,123 B2
(45) Date of Patent: *Mar. 10, 2020

(54) WIRELESS POWER TRANSMITTER FOR EXCLUDING CROSS-CONNECTED WIRELESS POWER RECEIVER AND METHOD FOR CONTROLLING THE SAME

(71) Applicant: Samsung Electronics Co., Ltd., Gyeonggi-do (KR)

(72) Inventors: Hyuk-Choon Kwon, Seoul (KR); Nam-Yun Kim, Seoul (KR); Ho-Dong Kim, Seoul (KR); Kang-Ho Byun, Gyeonggi-do (KR); Kyung-Woo Lee, Seoul (KR); Hee-Won Jung, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/682,204

(22) Filed: Aug. 21, 2017

(65) Prior Publication Data

US 2017/0346301 A1 Nov. 30, 2017

Related U.S. Application Data

(63) Continuation of application No. 15/070,853, filed on Mar. 15, 2016, which is a continuation of application
(Continued)

(30) Foreign Application Priority Data

Sep. 5, 2012 (KR) .......................... 10-2012-0098509
Jan. 21, 2013 (KR) .......................... 10-2013-0006732
(Continued)

(51) Int. Cl.
*H02J 5/00* (2016.01)
*H04B 5/00* (2006.01)
(Continued)

(52) U.S. Cl.
CPC .............. *H02J 5/005* (2013.01); *H02J 7/025* (2013.01); *H02J 50/60* (2016.02); *H04B 5/0037* (2013.01)

(58) Field of Classification Search
CPC . H02J 5/005; H02J 50/60; H02J 7/025; H04B 5/0037
(Continued)

(56) References Cited

U.S. PATENT DOCUMENTS 7,809,394 B1 10/2010 Li et al.
8,471,489 B2 6/2013 Lee et al.
(Continued)

FOREIGN PATENT DOCUMENTS

CN 102165671 8/2011
CN 102341985 2/2012
(Continued)

OTHER PUBLICATIONS

European Search Report dated Feb. 16, 2016 issued in counterpart application No. 13835548.2-1874, 9 pages.
(Continued)

*Primary Examiner* — Carlos Amaya
(74) *Attorney, Agent, or Firm* — The Farrell Law Firm, P.C.

(57) ABSTRACT

A method and apparatus for controlling a wireless power transmitter configured to transmit power to a wireless power receiver is provided. The method includes receiving a first signal from the wireless power receiver, wherein the first signal comprises load detection indication bits, detecting a change in load of the wireless power transmitter caused by placement of the wireless power receiver in a charging area of the wireless power transmitter, based on the load detection indication bits, and determining whether to transmit a second signal to the wireless power receiver based on
(Continued)

detecting the change in load of the wireless power transmitter.

11 Claims, 11 Drawing Sheets

Related U.S. Application Data

No. 14/019,057, filed on Sep. 5, 2013, now Pat. No. 9,306,636.

(30) Foreign Application Priority Data

| May 9, 2013 | (KR) | ......................... 10-2013-0052760 |
| May 10, 2013 | (KR) | ......................... 10-2013-0053449 |

(51) Int. Cl.
*H02J 50/60* (2016.01)
*H02J 7/02* (2016.01)

(58) Field of Classification Search
USPC .......................................................... 307/104
See application file for complete search history.

(56) References Cited

U.S. PATENT DOCUMENTS

| 9,306,636 | B2 | 4/2016 | Kwon et al. |
| 9,722,446 | B2* | 8/2017 | Kwon ..................... H02J 7/007 |
| 2006/0057967 | A1 | 3/2006 | Shimada |
| 2007/0021140 | A1 | 1/2007 | Keyes et al. |
| 2008/0211455 | A1 | 9/2008 | Park et al. |
| 2009/0021219 | A1 | 1/2009 | Yoda et al. |
| 2010/0066509 | A1 | 3/2010 | Okuizumi et al. |
| 2010/0171461 | A1 | 7/2010 | Baarman et al. |
| 2010/0248622 | A1 | 9/2010 | Lyell Kirby et al. |
| 2011/0244913 | A1 | 10/2011 | Kim et al. |
| 2011/0260532 | A1 | 10/2011 | Tanabe |
| 2011/0260549 | A1* | 10/2011 | Jung ..................... H02J 7/0027 307/104 |
| 2012/0146576 | A1 | 6/2012 | Partovi |
| 2012/0161535 | A1 | 6/2012 | Jung et al. |
| 2012/0164943 | A1 | 6/2012 | Bennett |
| 2013/0082536 | A1 | 4/2013 | Taylor et al. |
| 2013/0154558 | A1 | 6/2013 | Lee et al. |
| 2013/0181665 | A1 | 7/2013 | Lee et al. |
| 2013/0234503 | A1 | 9/2013 | Ichikawa |
| 2014/0028098 | A1 | 1/2014 | Trigiani |
| 2014/0159653 | A1 | 6/2014 | Von Novak et al. |
| 2014/0197785 | A1 | 7/2014 | Lee et al. |
| 2014/0333151 | A1 | 11/2014 | Matsui et al. |
| 2015/0022147 | A1 | 1/2015 | Jung |
| 2015/0133056 | A1 | 5/2015 | Kang et al. |

FOREIGN PATENT DOCUMENTS

| KR | 10-2011-0103297 | 9/2011 |
| WO | WO 2010/040015 | 4/2010 |
| WO | WO 2011/112010 | 9/2011 |
| WO | WO 2012/073349 | 6/2012 |

OTHER PUBLICATIONS

Chinese Office Action dated Aug. 2, 2016 issued in counterpart application No. 201380046302.6, 14 pages.

European Search Report dated Dec. 6, 2017 issued in counterpart application No. 17187354.0-1874, 8 pages.

U.S. Office Action dated Mar. 22, 2018 issued in counterpart U.S. Appl. No. 15/070,853, 25 pages.

\* cited by examiner

WIRELESS POWER TRANSMITTER FOR EXCLUDING CROSS-CONNECTED WIRELESS POWER RECEIVER AND METHOD FOR CONTROLLING THE SAME

PRIORITY

This application is a continuation application of U.S. patent application Ser. No. 15/070,853, filed on Mar. 15, 2016, which is a continuation application of U.S. patent application Ser. No. 14/019,057 (now U.S. Pat. No. 9,306, 636), filed on Sep. 5, 2013, which claims priority under 35 U.S.C. § 119(a) to a Korean Patent Application filed in the Korean Intellectual Property Office on Sep. 5, 2012 and assigned Serial No. 10-2012-0098509, a Korean Patent Application filed in the Korean Intellectual Property Office on Jan. 21, 2013 and assigned Serial No. 10-2013-0006732, a Korean Patent Application filed in the Korean Intellectual Property Office on May 9, 2013 and assigned Serial No. 10-2013-0052760 and a Korean Patent Application filed in the Korean Intellectual Property Office on May 10, 2013 and assigned Serial No. 10-2013-0053449, the entire content of each of which is incorporated herein by reference.

BACKGROUND OF THE INVENTION

1. Field of the Invention

The present invention relates generally to a wireless power transmitter and a method for controlling the same, and more particularly, to a wireless power transmitter capable of communicating using a predetermined scheme and a method for controlling the wireless power transmitter.

2. Description of the Related Art

Due to their portability, mobile terminals, such as cellular phones and Personal Digital Assistants (PDAs) are powered by rechargeable batteries. In order to charge a rechargeable battery, a separate charging device is used to supply electrical energy to the battery. Generally, the charging device and the battery have their own external contact terminals, so that the charging device and battery can be electrically connected by physically connecting their contact terminals to each other.

However, when using the above-described contact-type charging method, the contact terminals, which may protrude outward from the charging device and/or battery, are may be contaminated by foreign substances, causing a battery charging failure. A battery charging failure may also occur even when the contact terminals are exposed to moisture.

In order to address these and other problems and disadvantages, wireless and contactless charging technologies have recently been developed and used in many electronic devices.

This wireless charging technology, which uses wireless power transmission/reception, may refer to, for example, a system in which a battery of a cellular phone may be automatically or wirelessly charged when a user merely puts the cellular phone on a charging pad without connecting the cellular phone to a separate charging device via a charging connector. Generally, wireless electric toothbrushes or wireless electric shavers are well known examples of devices employing wireless charging technology. Wireless charging technology can improve the waterproof functions of devices, and can increase the portability of electronic devices since the technology does not require a wired charger. Technologies related wireless charging are expected to significantly evolve along with an upcoming increased usage of electric cars.

Wireless charging technologies can be roughly classified into an electromagnetic induction scheme using coils, a resonance scheme using resonances, and a Radio Frequency (RF)/microwave radiation scheme that transfers electrical energy by converting the electrical energy into microwaves.

From among the above-listed schemes, the electromagnetic induction scheme has been primarily used. However, experiments to wirelessly transfer power from a distance of tens of meters using microwaves have been successful. Therefore, an era of wirelessly charging all electronic products without wires at any time or location may arrive in the near future.

The electromagnetic induction-based power transmission method includes transferring power between a primary coil and a secondary coil. If a magnet moves around a coil, an induced current is generated. Based on this principle, a transmitter generates magnetic fields and a current is induced at a receiver due to the change in the magnetic field, generating electrical energy. This phenomenon is referred to as electromagnetic induction, and a power transmission method based thereon provides excellent energy transmission efficiency.

In 2005, a system in which electricity is wirelessly transferred by using resonance scheme-based power transmission principle as a coupled mode theory, which can be applied even when an electronic device is several meters apart from a charging device was developed. The wireless charging system uses a physics concept, called resonance, where, if a tuning fork sounds, a nearby wine glass also sounds at the same frequency. Resonance signals of electromagnetic waves containing electrical energy instead of ringing a tuning fork were generated. The resonance electrical energy is directly transferred only to the electronic device having a resonant frequency, and the rest of the resonance electrical energy is re-absorbed as electromagnetic fields instead of spreading into the air, and therefore, unlike other electromagnetic waves, the resonance electrical energy does not affect nearby machines and bodies.

Many studies on the wireless charging have been conducted in recent years. However, no standard has been proposed for the wireless charging order, the search for wireless power transmitters/receivers, the selection of a communication frequency between wireless power transmitter and receiver, the wireless power adjustment, the selection of a matching circuit, and the allocation of communication time to each of wireless power receivers in one charging cycle, for example. In particular, there is a need for a standard for a structure and procedure in which a wireless power receiver selects a wireless power transmitter from which it will receive wireless power.

A wireless power transmitter and a wireless power receiver may communicate with each other based on a predetermined scheme, such as, Zig-bee and Bluetooth Low Energy (BLE). The available communication distance increases by means of the out-band scheme such as Zig-bee and BLE. Accordingly, the wireless power transmitter and the wireless power receiver may communicate with each other even when these devices are spaced far apart from each other. For example, the wireless power transmitter may communicate with the wireless power receiver, even if the wireless power transmitter is placed in the relatively long distance where it cannot transfer wireless power.

In the example of FIG. 1, a first wireless power transmitter TX1 and a second wireless power transmitter TX2 are placed. In addition, a first wireless power receiver RX1 is placed on or over the first wireless power transmitter TX1, and a second wireless power receiver RX2 is placed on or over the second wireless power transmitter TX2. The first wireless power transmitter TX1 needs to transfer its power to the first wireless power receiver RX1 placed adjacent thereto. Likewise, the second wireless power transmitter TX2 needs to transfer its power to the second wireless power receiver RX2 placed adjacent thereto. Preferably, therefore, the first wireless power transmitter TX1 communicates with the first wireless power receiver RX1, and the second wireless power transmitter TX2 communicates with the second wireless power receiver RX2. However, as the communication distance increases, the first wireless power receiver RX1 may join the wireless power network controlled by the second wireless power transmitter TX2, while the second wireless power receiver RX2 may join the wireless power network controlled by the first wireless power transmitter TX1. This situation is called "cross connection". In the present example, the first wireless power transmitter TX1 transfers power required by the second wireless power receiver RX2, instead of the power required by the first wireless power receiver RX1. If the second wireless power receiver RX2 has a higher capacity than the first wireless power receiver RX1, the first wireless power receiver RX1 may be overcharged. However, if the second wireless power receiver RX2 has a lower capacity than the first wireless power receiver RX1, the first wireless power receiver RX1 may be undercharged.

SUMMARY OF THE INVENTION

The present invention has been made to address at least the above-mentioned problems and/or disadvantages and to provide at least the advantages described below. Accordingly, an aspect of the present invention provides a wireless power transmitter for excluding a cross-connected wireless power receiver and a method for controlling the same.

In accordance with an aspect of the present invention, a method for controlling a wireless power transmitter configured to transmit power to a wireless power receiver is provided. The method includes receiving a first signal from the wireless power receiver, wherein the first signal comprises load detection indication bits, detecting a change in load of the wireless power transmitter caused by placement of the wireless power receiver in a charging area of the wireless power transmitter, based on the load detection indication bits, and determining whether to transmit a second signal to the wireless power receiver based on detecting the change in load of the wireless power transmitter.

In accordance with another aspect of the present invention, a wireless power transmitter configured to transmit power to a wireless power receiver is provided. The wireless power transmitter includes a resonant signal generator configured to transmit power to the wireless power receiver, a wireless communication unit configured to receive a first signal from the wireless power receiver, wherein the first signal comprises load detection indication bits, and a controller configured to detect a change in load of the wireless power transmitter caused by placement of the wireless power receiver in the charging area of the wireless power transmitter, based on the load detection indication bits, and determine to transmit a second signal to the wireless power receiver based on detecting the change in load of the wireless power transmitter.

In accordance with another aspect of the present invention, a method for controlling a wireless power transmitter configured to transmit power to a wireless power receiver is provided. The method includes detecting a change in load of the wireless power transmitter caused by placement of the wireless power receiver in the charging area of the wireless power transmitter at a first time point during application of a detection power to a resonant signal generator of the wireless power transmitter, receiving a first signal from the wireless power receiver at a second time point, and determining whether to transmit a second signal to the wireless power receiver based on a difference between the first time point and the second time point.

In accordance with another aspect of the present invention, a wireless power transmitter configured to transmit power to a wireless power receiver is provided. The wireless power transmitter includes a resonant signal generator configured to transmit power to the wireless power receiver, a controller configured to detect a change in load of the wireless power transmitter caused by placement of the wireless power receiver in the charging area of the wireless power transmitter at a first time point during which the resonant signal generator receives a detection power, and a wireless communication unit configured to receive a first signal from the wireless power receiver at a second time point, wherein the controller is configured to determine whether to transmit a second signal to the wireless power receiver based on a difference between the first time point and the second time point.

BRIEF DESCRIPTION OF THE DRAWINGS

The above and other aspects, features and advantages of certain embodiments of the present invention will be more apparent from the following description taken in conjunction with the accompanying drawings, in which.

DETAILED DESCRIPTION OF EMBODIMENTS OF THE PRESENT INVENTION

Figure 1:
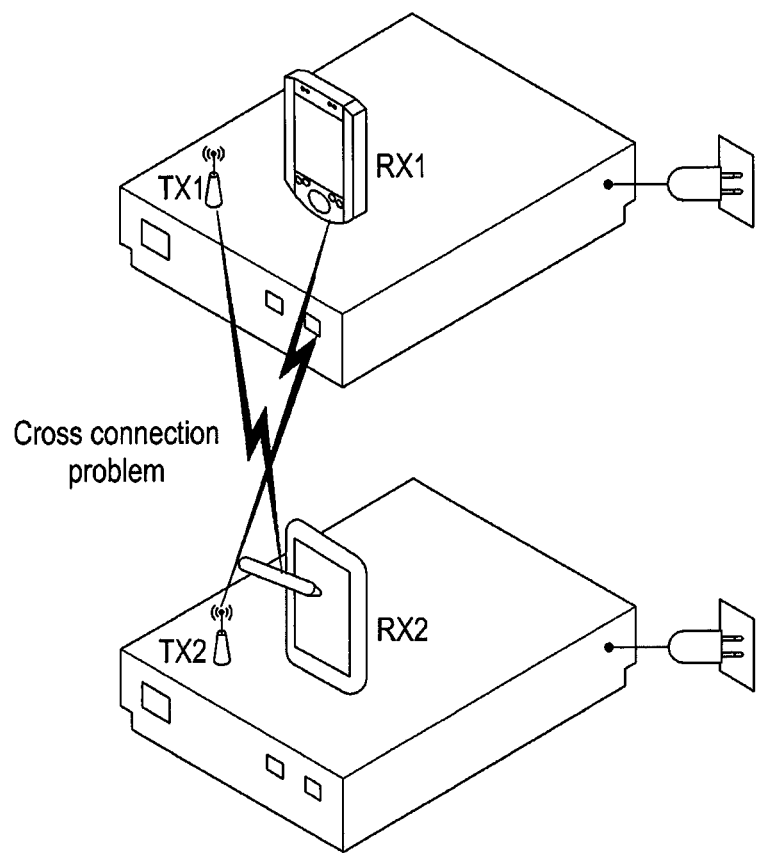
FIG. 1 is a diagram illustrating a wireless charging system with a cross connection problem.

The following description with reference to the accompanying drawings is provided to assist in a comprehensive understanding of embodiments of the invention as defined by the claims and their equivalents. It includes various specific details to assist in that understanding but these are to be regarded as mere examples. Accordingly, those of ordinary skilled in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to their dictionary meanings, but are merely used to enable a clear and consistent understanding of the invention.

Throughout the drawings, like reference numerals will be understood to refer to like parts, components, and structures.

Figure 2:
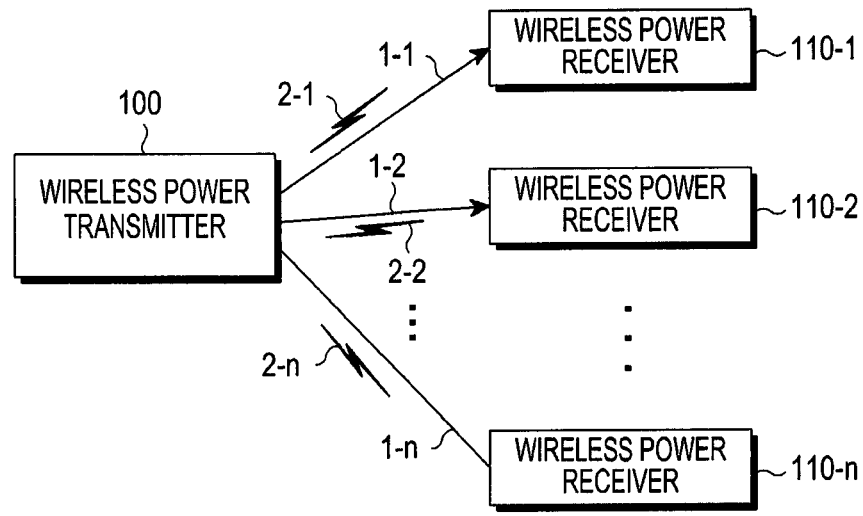
FIG. 2 is a diagram illustrating operation of a wireless charging system according to an embodiment of the present invention.

FIG. 2 is a diagram illustrating overall operation of a wireless charging system according to an embodiment of the present invention. As illustrated in FIG. 2, the wireless charging system includes a wireless power transmitter 100 and at least one wireless power receivers 110-1, 110-2, and 110-n.

The wireless power transmitter 100 wirelessly transfers power 1-1, 1-2, and 1-n to the at least one wireless power receivers 110-1, 110-2, and 110-n, respectively. More specifically, the wireless power transmitter 100 wirelessly transfers the power 1-1, 1-2, and 1-n only to wireless power receiver(s) that is authenticated after undergoing a predetermined authentication procedure.

The wireless power transmitter 100 forms an electrical connection to the wireless power receivers 110-1, 110-2, and 110-n. For example, the wireless power transmitter 100 transfers wireless power in the form of electromagnetic waves to the wireless power receivers 110-1, 110-2, and 110-n.

The wireless power transmitter 100 performs bi-directional communication with the wireless power receivers 110-1, 110-2, and 110-n. The wireless power transmitter 100 and the wireless power receivers 110-1, 110-2, and 110-n process and transmit/receive packets 2-1, 2-2, and 2-n which are configured in a predetermined frame. The predetermined frame is described in detail below. The wireless power receiver may be implemented as, for example, a mobile communication terminal, a Personal Digital Assistant (PDA), a Personal Multimedia Player (PMP), a smart phone, etc.

The wireless power transmitter 100 wirelessly supplies power to the multiple wireless power receivers 110-1, 110-2, and 110-n. For example, the wireless power transmitter 100 may transfer power to the multiple wireless power receivers 110-1, 110-2, and 110-n using the resonance scheme. If the wireless power transmitter 100 adopts the resonance scheme, the distance between the wireless power transmitter 100 and the multiple wireless power receivers 110-1, 110-2, and 110-n may be 30 m or less, for example. If the wireless power transmitter 100 adopts the electromagnetic induction scheme, the distance between the wireless power transmitter (or power supply device) 100 and the multiple wireless power receivers 110-1, 110-2, and 110-n may be 10 cm or less, for example.

Each of the wireless power receivers 110-1, 110-2, and 110-n receives wireless power from the wireless power transmitter 100 and charges a battery mounted therein. Each of the wireless power receivers 110-1, 110-2, and 110-n transmits, to the wireless power transmitter 100, at least one of a signal for requesting transfer of wireless power, information needed for reception of wireless power, status information about a wireless power receiver, and control information for the wireless power transmitter 100. Information about the transmission signals is described in detail below.

The wireless power receivers 110-1, 110-2, and 110-n send a message indicating their own charging state, to the wireless power transmitter 100.

The wireless power transmitter 100 includes a display means such as a display, and displays the state of each of the wireless power receivers 110-1, 110-2, and 110-n based on the messages received from the wireless power receivers 110-1, 110-2, and 110-n. In addition, the wireless power transmitter 100 also displays the time that is expected until each of the wireless power receivers 110-1, 110-2, and 110-n is fully charged.

The wireless power transmitter 100 transmits a control signal for disabling the wireless charging function to each of the wireless power receivers 110-1, 110-2, and 110-n. Upon receiving the control signal for disabling the wireless charging function from the wireless power transmitter 100, a wireless power receiver disables its wireless charging function.

Figure 3A:
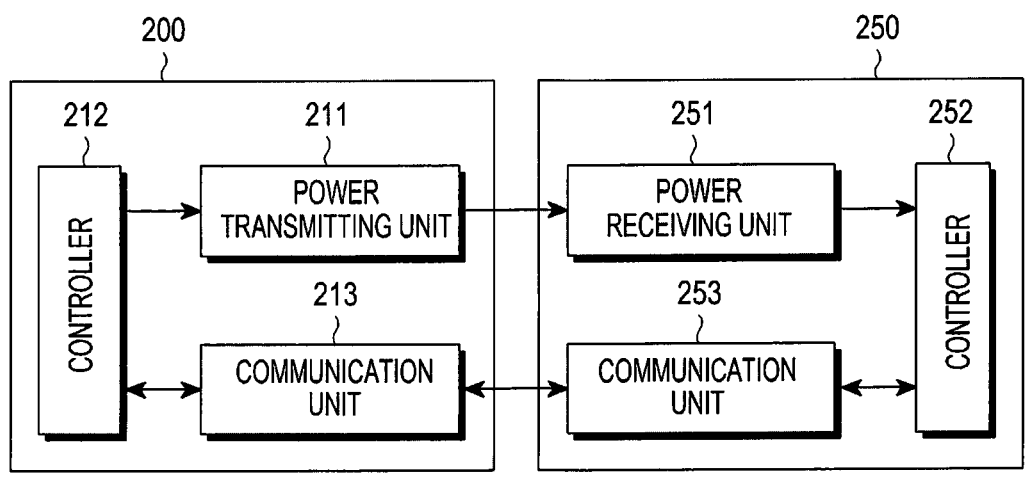
FIG. 3A is a block diagram illustrating a wireless power transmitter and a wireless power receiver according to an embodiment of the present invention.

FIG. 3A is a block diagram illustrating a wireless power transmitter and a wireless power receiver according to an embodiment of the present invention.

As illustrated in FIG. 3A, a wireless power transmitter 200 includes a power transmitting unit 211, a controller 212 and a communication unit 213. A wireless power receiver 250 includes a power receiving unit 251, a controller 252 and a communication unit 253.

The power transmitting unit 211 supplies the power required by the wireless power transmitter 200, and wirelessly supplies power to the wireless power receiver 250. The power transmitting unit 211 supplies power in the form of an Alternating Current (AC) waveform. The power transmitting unit 211 may supply power in the form of an AC waveform after converting the power being supplied in the form of Direct Current (DC) waveform into AC waveform using an inverter. The power transmitting unit 211 may be implemented in the form of a built-in battery, or in the form of a power receiving interface to receive power from the outside and supply it to other components. Other means that can supply power in the form of a predetermined AC waveform may replace the power transmitting unit 211 in accordance with embodiments of the present invention.

In addition, the power transmitting unit 211 supplies AC power to the wireless power receiver 250 in the form of electromagnetic waves. The power transmitting unit 211 may further include a loop coil (not shown), and thus may transmit and receive predetermined electromagnetic waves. If the power transmitting unit 211 is implemented with a loop coil, an inductance L of the loop coil is changeable. Any other means that can transmit and receive electromagnetic waves can replace the power transmitting unit 211 in accordance with embodiments of the present invention.

The controller 212 controls the overall operation of the wireless power transmitter 200, such as by using an algorithm and/or a program or application, which are read from a storage (not shown) and are required for the control. The controller 212 may be implemented in the form of a Central Processing Unit (CPU), a microprocessor, a mini computer, etc. Operation of the controller 212 is described in detail below.

The communication unit 213 communicates with the wireless power receiver 250 using a predetermined communication scheme. For example, the communication unit 213 may communicate with the communication unit 253 in the wireless power receiver 250 using Near Field Communication (NFC), Zig-bee, Infrared Data Association (IrDA), Visual Light Communication (VLC), etc. In the following examples in accordance with an embodiment of the present invention, the communication unit 213 is assumed to perform communication using Zig-bee defined in Institute of Electrical and Electronics Engineers (IEEE) 802.15.4. The communication unit 213 may also use a Carrier Sense Multiple Access with Collision Avoidance (CSMA/CA) algorithm. The frequency used by the communication unit 213 and the channel selection configuration will be described in detail below. The above-described communication scheme is merely provided as an illustrative example, and other communication schemes may be used in accordance with embodiments of the present invention.

The communication unit 213 transmits a signal regarding information about the wireless power transmitter 200. The communication unit 213 may transmit the signal in any of unicast, multicast, and broadcast methods. Table 1 below illustrates a data structure of the signal transmitted from the wireless power transmitter 200 according to an embodiment of the present invention. The wireless power transmitter 200 may transmit a signal having the following frame at intervals of a predetermined time, and the signal may be called a Notice signal, as shown below.

TABLE 1

| frame type | protocol version | sequence number | network ID | RX to Report (schedule mask) | Reserved | Number of Rx |
|---|---|---|---|---|---|---|
| Notice | 4 bit | 1 Byte | 1 Byte | 1 Byte | 5 bit | 3 bit |

A 'frame type' field in Table 1 indicates a type of the signal, and indicates in Table 1 that the signal is a Notice signal. A 'protocol version' field indicates a protocol type of the communication scheme, and may be allocated, for example, 4 bits. A 'sequence number' field indicates the sequential order of the signal, and may be allocated, for example, 1 byte. For example, a value of the 'sequence number' field may increase one by one depending on the transmission/reception stage of the signal. A 'network ID' field indicates a network IDentifier (ID) of the wireless power transmitter 200, and may be allocated, for example, 1 byte. An 'Rx to Report(schedule mask)' field indicates wireless power receivers that will make a report to the wireless power transmitter 200, and may be allocated, for example, 1 byte. Table 2 below illustrates the 'Rx to Report(schedule mask)' according to an embodiment of the present invention.

TABLE 2

| Rx to Report(schedule mask) | | | | | | | |
|---|---|---|---|---|---|---|---|
| Rx1 | Rx2 | Rx3 | Rx4 | Rx5 | Rx6 | Rx7 | Rx8 |
| 1 | 1 | 1 | 1 | 1 | 1 | 1 | 1 |

In Table 2, Rx1 to Rx8 correspond to wireless power receivers #1 to #8. The 'Rx to Report(schedule mask)' field may be implemented such that a wireless power receiver, a number of whose schedule mask is represented as '1', may make a report.

A 'Reserved' field is reserved for the future use, and may be allocated 5 bytes, for example. A 'Number of Rx' field indicates the number of wireless power receivers adjacent to the wireless power transmitter 200, and may be allocated, for example, 3 bits.

A signal with the frame format of Table 1 may be implemented in such a manner that it is allocated to Wireless Power Transfer (WPT) in the data structure defined in IEEE 802.15.4. Table 3 illustrates a data structure as defined in IEEE 802.15.4.

TABLE 3

| Preamble | SFD | Frame Length | WPT | CRC16 |
|---|---|---|---|---|

As illustrated in Table 3, the data structure of IEEE 802.15.4 includes 'Preamble', a Start Frame Delimiter 'SFD', 'Frame Length', 'WPT', and a Cyclic Redundancy Check 'CRC16' fields. The data structure of Table 1 may be included in the WPT field.

The communication unit 213 receives power information from the wireless power receiver 250. The power information includes at least one of the chargeable capacity, the battery level, the charging count, the usage, the remaining capacity of the battery, and the battery percentage, of the wireless power receiver 250. The communication unit 213 transmits a charging function control signal for controlling the charging function of the wireless power receiver 250. The charging function control signal is a control signal for controlling the power receiving unit 251 in a specific wireless power receiver 250 to enable or disable the charging function of the wireless power receiver 250.

The communication unit 213 may receive signals, not only from the wireless power receiver 250, but also from another wireless power transmitter (not shown). For example, the communication unit 213 may receive the Notice signal with the frame of Table 1 from another wireless power transmitter.

Although, in the example according to FIG. 3A, the power transmitting unit 211 and the communication unit 213 are configured in different hardware structures so that the wireless power transmitter 200 may perform communication in an out-band form, this is merely provided as an illustrative example. According to alternative embodiments of the present invention, the power transmitting unit 211 and the communication unit 213 may be implemented in a single hardware structure so that the wireless power transmitter 200 perform communication in an in-band form.

The wireless power transmitter 200 and the wireless power receiver 250 exchange various signals with each other, making it possible to perform a charging process, in which the wireless power receiver 250 joins the wireless power network controlled by the wireless power transmitter 200 and receives the wireless power transferred from the wireless power transmitter 200. This wireless power transfer process is described in detail below.

Figure 3B:
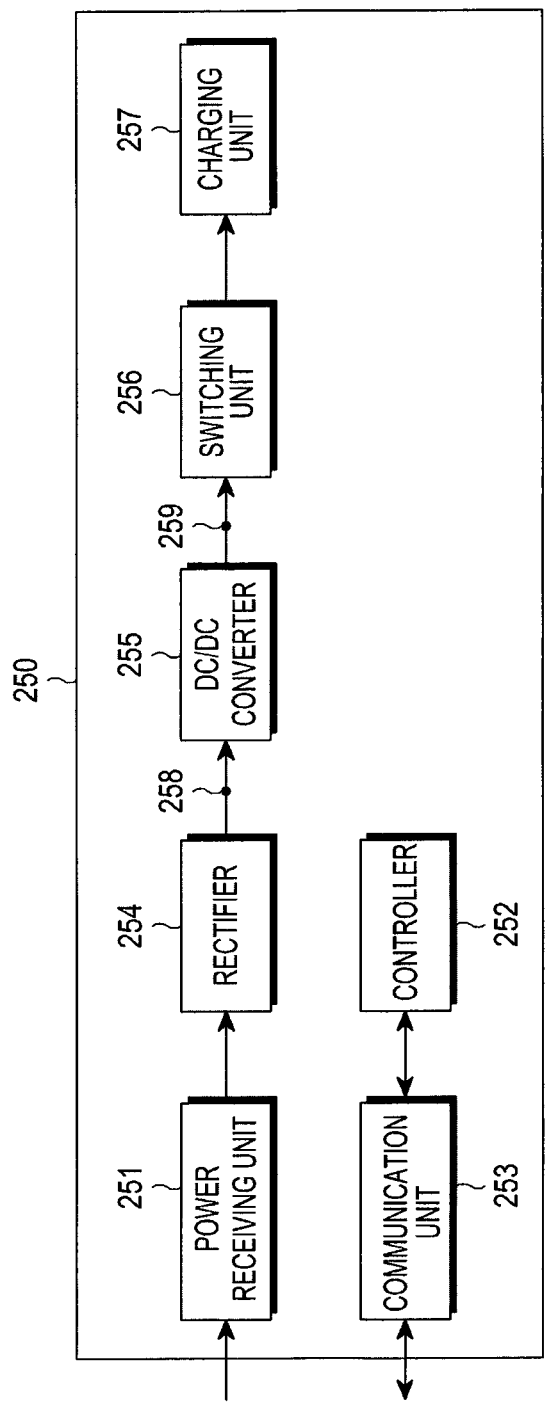
FIG. 3B is a block diagram illustrating a wireless power receiver according to an embodiment of the present invention.
Figure 3C:
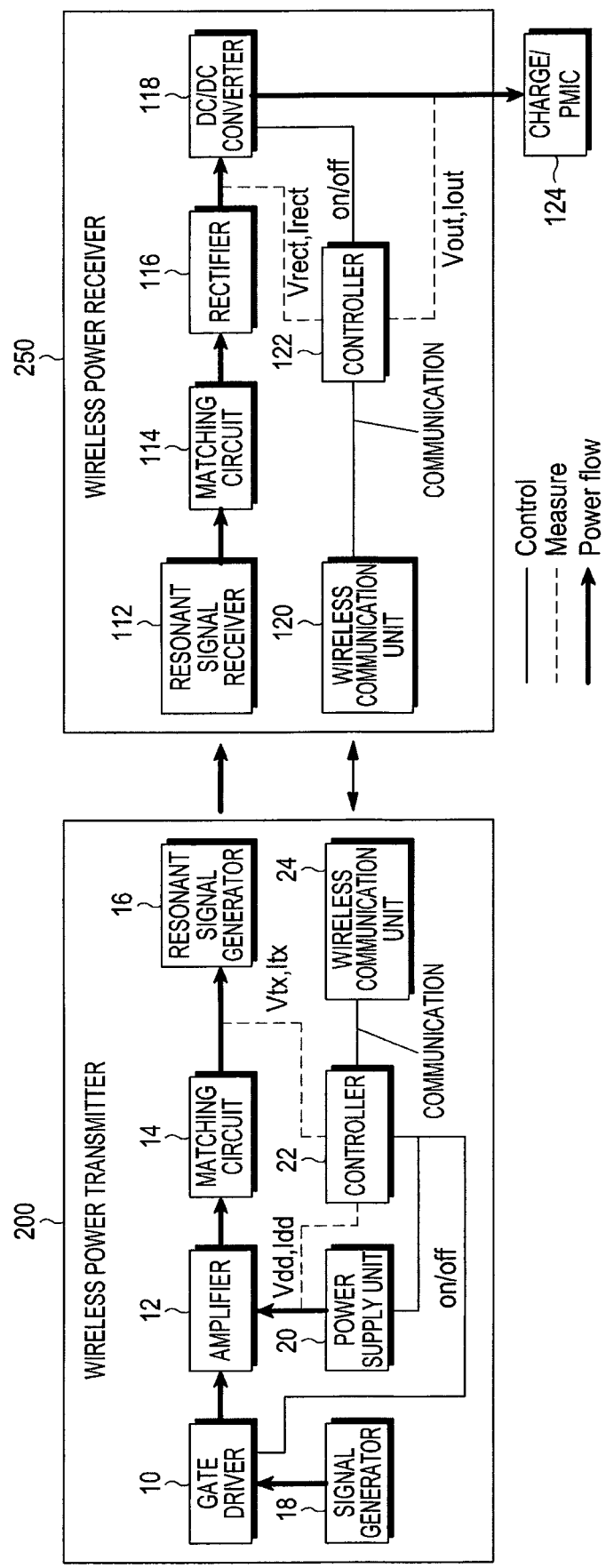
FIG. 3C is a block diagram illustrating a wireless power transmitter and a wireless power receiver according to another embodiment of the present invention.

A detailed structure of the same wireless power transmitter 200 illustrated in brief in FIG. 3A is illustrated in FIG. 3C, which is described in detail herein below. FIG. 3B is a block diagram illustrating a wireless power receiver according to an embodiment of the present invention. Specifically, FIG. 3B illustrates the detailed structure of the wireless power receiver 250 in FIG. 3A. The wireless power receiver 250 in FIG. 3A may also be implemented to include the components illustrated in FIG. 3C.

As illustrated in FIG. 3B, the wireless power receiver 250 may include the power receiving unit 251, the controller 252, the communication unit 253, a rectifier 254, a DC/DC converter 255, a switching unit 256 and a charging unit 257.

A further description of the power receiving unit 251, the controller 252 and the communication unit 253, which are already described herein with respect to FIG. 3A, is omitted for clarity and conciseness. The rectifier 254 rectifies the wireless power received at the power receiving unit 251 in DC form, and may be implemented in the form of a bridge diode, for example. The DC/DC converter 255 may convert the rectified power with a set gain. For example, the DC/DC converter 255 may convert the rectified power so that its output terminal 259 has a voltage of 5V. The minimum value and maximum value of the voltage that can be applied to a front end 258 of the DC/DC converter 255 may be set in advance, and they may be recorded in an 'Input Voltage MIN' field an 'Input Voltage MAX' field of a below-described join request signal (also known as a 'Request join signal'), respectively. In addition, a value of a rated voltage and a value of a rated current, which are applied to and conducted at the rear end 259 of the DC/DC converter 255, may be written in a 'Typical Output Voltage' field and a 'Typical Output Current' field of the join request signal, respectively.

The switching unit 256 connects the DC/DC converter 255 to the charging unit 257. The switching unit 256 keeps its on/off state under a control of the controller 252. The charging unit 257 stores the converted power received from the DC/DC converter 255, if the switching unit 256 is in the on-state.

FIG. 3C is a block diagram illustrating a wireless power transmitter and a wireless power receiver according to another embodiment of the present invention. FIG. 3C illustrates the voltage and current in the wireless power transmitter and the voltage and current in the wireless power receiver, which are used to check the cross connection.

Referring to FIG. 3C, the wireless power transmitter 200 includes a signal generator 18 that includes a Voltage Control Oscillator (VCO) and other similar elements; an amplifier 12 that receives a frequency signal in a specific range, which is output from the signal generator 18, via a gate driver 10, and amplifies the received frequency signal with high power; a power supply unit 20 that supplies power so as to output the frequency signal output from the signal generator 18 as a resonant frequency signal determined by a controller 22; a matching circuit 14 for performing impedance matching; a resonant signal generator 16 that outputs the power from the power supply unit 20 to one or more wireless power receivers using wireless resonant signals depending on the output-power signals generated in the amplifier 12; and the controller 22 for collectively controlling the wireless power transmission operation of the wireless power transmitter 200.

The controller 22 measures a voltage Vdd and a current Idd of a signal generated in the power supply unit 20, and monitors a current Itx and a voltage Vtx of a resonant signal, which is wirelessly transmitted. Although, in the example of FIG. 3C, the measurement of the voltage Vdd and current Idd and the monitoring of the current Itx and voltage Vtx of the resonant signal are performed in the controller 22, a separate voltage/current measurement unit (not shown) for the measurement and monitoring operation may be added in accordance with embodiments of the present invention.

The wireless power transmitter 200 according to an embodiment of the present invention performs a charging operation with the wireless power receiver 250, which is placed in a charging area, for example, placed on or over a charging pad, but the wireless power transmitter 200 may have multiple wireless power receivers located within a valid distance from its charging area. In this case, the wireless power transmitter 200 may be cross-connected to other wireless power receivers, instead of being connected to the valid wireless power receiver 250, which is placed on or over the charging pad. In order to prevent this cross connection, the controller 22, according to an embodiment of the present invention, identifies a valid wireless power receiver in any of several ways, described as follow.

The controller 22 determines whether the wireless power transmitter 200 is cross connected, before the actual charging starts or while the charging is underway.

The following embodiments of the present invention are described separately. A first embodiment of the present invention includes a process in which the wireless power transmitter 200 changes an amount of its transmission power before charging starts, and the wireless power transmitter 200 determines whether a power state at the wireless power receiver 250 has changed to correspond to the amount of the transmission power. A second embodiment of the present invention includes a process in which the wireless power transmitter 200 changes an amount of its transmission power while charging is underway, and the wireless power transmitter 200 determines whether a power state at the wireless power receiver 250 has changed to correspond to the amount of the transmission power.

Through this process, the wireless power transmitter 200 keeps its communication connection to the wireless power receiver 250 and performs a series of the succeeding processes, only if the power state has changed by an amount corresponding to the amount of its transmission power. However, if the power state at the wireless power receiver 250 has not changed to correspond to the amount of the transmission power, the wireless power transmitter 200 terminates its communication connection to the wireless power receiver 250. At this point, since the wireless power transmitter 200 is cross-connected to the wireless power receiver 250, the wireless power transmitter 200 may reset the wireless power transmission system. Subsequently, the wireless power transmitter 200 turns off its power.

Alternatively, the wireless power transmitter 200 may send a command for requesting termination of the cross connection to the wireless power receiver 250. The command for requesting termination of the cross connection is used to request the wireless power receiver 250 to terminate its communication connection to the wireless power network with the wireless power transmitter 200, and then to form a new wireless power network with another wireless power transmitter. The command for requesting termination of the cross connection may be sent to the wireless power receiver 250 through out-of-band communications. In response, the wireless power receiver 250 resumes establishing a wireless power network with another wireless power transmitter.

In addition, the wireless power transmitter 200 may exclude the cross-connected wireless power receiver by sending to the wireless power receiver 250 a command to form a network with another wireless power transmitter, or a command to switch to a standby mode.

In accordance with the first embodiment of the present invention, before the charging starts, the controller 22 controls the power transmission to drive the wireless power receiver 250.

Specifically, before the charging starts, the controller 22 detects a load and then determines that the wireless power receiver 250 is placed in its charging area. Subsequently, if the controller 22 controls the power transmission to drive the wireless power receiver 250, the wireless power receiver 250 is powered-on by receiving the power, and performs a series of operations of joining the wireless power network. For example, the wireless power receiver 250 may transmit a search frame to search for its nearby wireless power transmitters, or may transmit a join request frame (also known as a 'Request join frame') for requesting its join in the wireless power network controlled by the wireless power transmitter 200. While performing the series of operations of joining the wireless power network, the controller 22 of the wireless power transmitter 200 determines whether the wireless power receiver 250 is valid or not, based on the report frame, which is provided from the wireless power receiver 250 and includes power status information.

The controller 22 receives the report frame including power status information from the wireless power receiver 250 that has received the power in response to the power transmission. The power status information includes a measured voltage Vrect and a measured current Irect. The controller 22 changes the amount of its transmission power in order to identify a valid wireless power receiver.

In order to change the amount of the transmission power, the controller 22 provides a voltage value to the power supply unit 20, and controls an on/off-operation of the gate driver 10. According to embodiments of the present invention, changing the amount of the transmission power may include changing the current Idd or changing the current Itx of the resonance signal from the resonant signal generator 16, in addition to changing the voltage Vdd output from the power supply unit 20 by adjusting a power value that the controller 22 provides to the power supply unit 20. In other words, in determining the change in a power-receiving state at the wireless power receiver 250, the controller 22 may use a method of adjusting the current Idd from the power supply unit 20 or adjust the current Itx of the resonant signal.

The controller 22 may also control the output power from the amplifier 12 by controlling the duty and level of the gate driver 10, which are applied to the amplifier 12. If the AC current input to the resonant signal generator 16 is changed, the magnetic field strength is changed. Thus, the output power may be adjusted by controlling the magnetic field strength. In other words, if the magnetic field strength is changed in the wireless power transmitter 200, the received power (for example, the measured voltage Vrect and measured current Irect) is changed at the wireless power receiver 250.

Each time the controller 22 receives a report frame that is received from the wireless power receiver 250 according to the change in the amount of the transmission power, the controller 22 analyzes the report frame, and determines if the measured voltage Vrect and measured current Irect at the wireless power receiver 250 have changed to correspond to the changed amount of the transmission power. If the measured voltage Vrect and measured current Irect have changed to correspond to the changed amount of the transmission power, the controller 22 determines that the wireless power receiver 250 is a valid wireless power receiver and proceeds with the next process. However, if a level of the measured voltage Vrect and measured current Irect, which have changed at the wireless power receiver 250 to correspond to the changed amount of the transmission power, does not fall within a valid range, the controller 22 terminates its communication connection to the wireless power receiver 250. By terminating the connection, the controller 22 forms a network only with the valid wireless power receiver, proceeds with a series of the succeeding processes, and terminates its communication connection to the cross-connected invalid wireless power receiver to exclude it from the wireless power network, thereby making it possible to prevent the cross connection.

According to an embodiment of the present invention, it is assumed that after the wireless power receiver 250 joins the wireless power network managed by the wireless power transmitter 200, the measured voltage Vrect and measured current Irect at the wireless power receiver 250 are received along with the report frame indicating the power-receiving state. However, the measured voltage Vrect and measured current Irect at the wireless power receiver 250 may be transmitted along with a search frame, a join request frame, etc. Alternatively, the measured voltage Vrect and measured current Irect at the wireless power receiver 250 may be received along with a response message that is received in response to an information request from the wireless power transmitter 200, or with an acknowledgement frame for a join response frame (also referred to as 'Response join' frame) indicating that the joint in the wireless power network is completed.

If the wireless power receiver 250 transmits an initial reference voltage (also referred to as a 'typical output voltage') and an initial reference current (also referred to as a 'typical output current'), the controller 22 may adjust the amount of the transmission power in response to the wireless power receiver 250. By using the initial reference voltage and the initial reference current, the controller 22 precisely determines the value by which the controller 22 will decrease or increase the amount of the transmission power depending on the amount of the power that the wireless power receiver 250 can receive. The initial reference voltage and the initial reference current are reference values used by the controller 22 to adjust the voltage Vdd to be output from the power supply unit 20 by determining a power value provided to the power supply unit 20 and providing it to the power supplying unit 20. The initial reference voltage and the initial reference current are carried on a frame that is transmitted from the wireless power receiver 250 to the wireless power transmitter 200 through a wireless communication unit 120. The type of the frame used for this transmission may be any type of frame that can be transmitted to the wireless power transmitter 200.

In accordance with the first embodiment of the present invention, even if the controller 22 receives a report including power status information via a wireless communication unit 24, the controller 22 may not necessarily determine, based only on the power status information, that the change in the power that has been received at the wireless power receiver 250 corresponds to the amount of the transmission power. Considering these cases, in the first embodiment of the present invention, the controller 22 may repeatedly change the amount of the transmission power within a predetermined number of times and receive a report thereon before the charging starts, thereby making it possible to compare the changes. Before the controller 22 receives a report frame from the wireless power receiver 250, the controller 22 does not have information corresponding to the amount of the transmission power to be used for a comparison. In this case, in comparing the changes, the controller 22 may use an initial reference voltage and an initial reference current that are provided from the wireless power receiver 250.

In accordance with the second embodiment of the present invention, the controller 22 controls the power transmission to charge the wireless power receiver 250, after the charging has started. In this charting phase, the wireless power transmitter 200 receives from the wireless power receiver 250 a report on the power-receiving state, which includes the measured voltage, as the wireless power transmitter 200 performs the power transmission. In other words, just like before the charging starts, each time the controller 22 of the wireless power transmitter 200 receives a report frame that is received from the wireless power receiver 250 depending on the change in the amount of the transmission power, the controller 22 analyzes the report frame, and then determines whether the measured voltage Vrect and measured current Irect at the wireless power receiver 250 have changed to correspond to the changed amount of the transmission power.

Through the above-described process, according to the second embodiment of the present invention, the controller 22 excludes the cross-connected invalid wireless power receiver 250 from the wireless power network even in the charging phase. For example, when the wireless power transmitter changes its charging power, and compares voltage information of its corresponding wireless power receiver with the change in the charging power, the wireless transmitter determines whether to keep the wireless power receiver within the wireless power network.

In order to communicate with the wireless power receiver 250 in relation to the wireless power transmission operation under control of the controller 22, the wireless power transmitter 200 includes the wireless communication unit 24 configured to employ a selected one of various wireless short-range communication schemes, such as Bluetooth, for example. The resonant signal generator 16 includes a charging board via which a wireless power receiver(s) may be placed on or over the resonant signal generator 16.

The controller 22 of the wireless power transmitter 200 may include a Micro Controller Unit (MCU). The operation of identifying a valid wireless power receiver to prevent the cross connection of the present invention is described herein below.

The wireless power receiver 250 includes a resonant signal receiver (or resonator) 112 for receiving a wireless resonant signal transmitted by the resonant signal generator 16 in the wireless power transmitter 200; a rectifier 116 that rectifies AC power into DC power if AC signals are received from the resonator 112 via a matching circuit 114; a DC/DC converter (or constant voltage generator) 118 for converting the power output from the rectifier 116 into the operating power (for example, +5V) desired by, for example, a mobile terminal to which the wireless power receiver is applied; a charging unit (or charge/Power Management IC (PMIC)) 124 for performing charging with the operating power; and a controller 122 for measuring an input voltage Vin which is input to the DC/DC converter 118, and an output voltage Vout and an output current Tout, which are received from the DC/DC converter 118. The controller 122, which may include an MCU, determines the power-receiving state according to the information about the measured voltage Vrect and measured current Irect, and provides information about the power-receiving state to the wireless power transmitter 200.

In order to communicate with the wireless power transmitter 200 in relation to the wireless power reception operation under control of the controller 122, the wireless power receiver 250 includes the wireless communication unit 120 configured to employ a selected one of various wireless short-range communication schemes such as Bluetooth.

In accordance with an embodiment of the present invention, the controller 122 generates a report frame for a power-receiving state upon receiving the power from the wireless power transmitter 200, and transmits the report frame to the wireless power transmitter 200 via the wireless communication unit 120. Accordingly, the controller 122 in the wireless power receiver 250 provides information about the power-receiving state, which is used in the wireless power transmitter 200 to determine whether the wireless power receiver 250 is cross-connected.

In accordance with another embodiment of the present invention, the controller 122 directly determines whether the wireless power receiver 250 is cross-connected. In this case, the controller 122 measures the power-receiving state based on the information about the measured voltage Vrect and measured current Irect, and request the wireless power transmitter 200 to control the amount of the transmission power, such as increasing or decreasing the amount of the transmission power. To this end, the controller 122 determines a reference voltage according to the information about the voltage and current measured by the controller 122 itself, and provides information about the reference voltage to the wireless power transmitter 200. The reference voltage is determined depending on the measured voltage Vrect, the output voltage Vout, and the output current Iout. For example, after the controller 122 determines the reference voltage as 7V and informs the wireless power transmitter 200 of the reference voltage of 7V, if the output voltage Vout is measured as 4V during charging, the controller 122 determines that this voltage is insufficient for charging. In this case, the controller 122 terminates its connection to the wireless power transmitter 200, upon determining that the wireless power transmitter 200 is not a valid wireless power transmitter.

As described above, both the wireless power transmitter 200 and the wireless power receiver 250 can determine whether the wireless power receiver 250 is cross-connected.

Figure 4A:
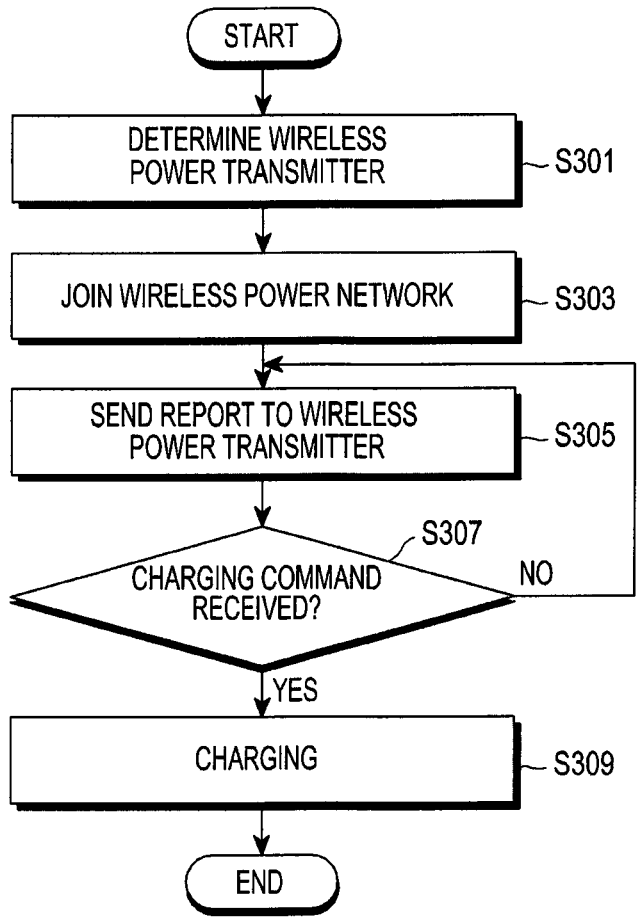
FIG. 4A is a flowchart illustrating a control method in a wireless power receiver according to an embodiment of the present invention.

FIG. 4A is a flowchart illustrating a control method in a wireless power receiver according to an embodiment of the present invention.

Referring to FIG. 4A, in step S301, a wireless power receiver 250 determines a wireless power transmitter 200 from which the wireless power receiver 250 will receive wireless power. For example, the wireless power receiver 250 may determine the wireless power transmitter 200 based on the Received Signal Strength Indication (RSSI) of a search response signal (also referred to as a 'Response search signal') received from the wireless power transmitter 200.

In step S303, the wireless power receiver 250 joins the wireless power network controlled by the wireless power transmitter 200. For example, the wireless power receiver 250 may send a join request signal, and join the wireless power network based on a join response signal (also referred to as a 'Response join signal') that is received in response thereto. In step S305, the wireless power receiver 250 sends a report signal in response to a command signal received from the wireless power transmitter 200. Upon receiving a command signal including a charging command from the wireless power transmitter 200 (Yes in step S307), the wireless power receiver 250 performs charging, in step S309. Upon failure to receive a command signal including a charging command (No in step S307), the wireless power receiver 250 sends a report signal to the wireless power transmitter 200, in step S305.

Figure 4B:
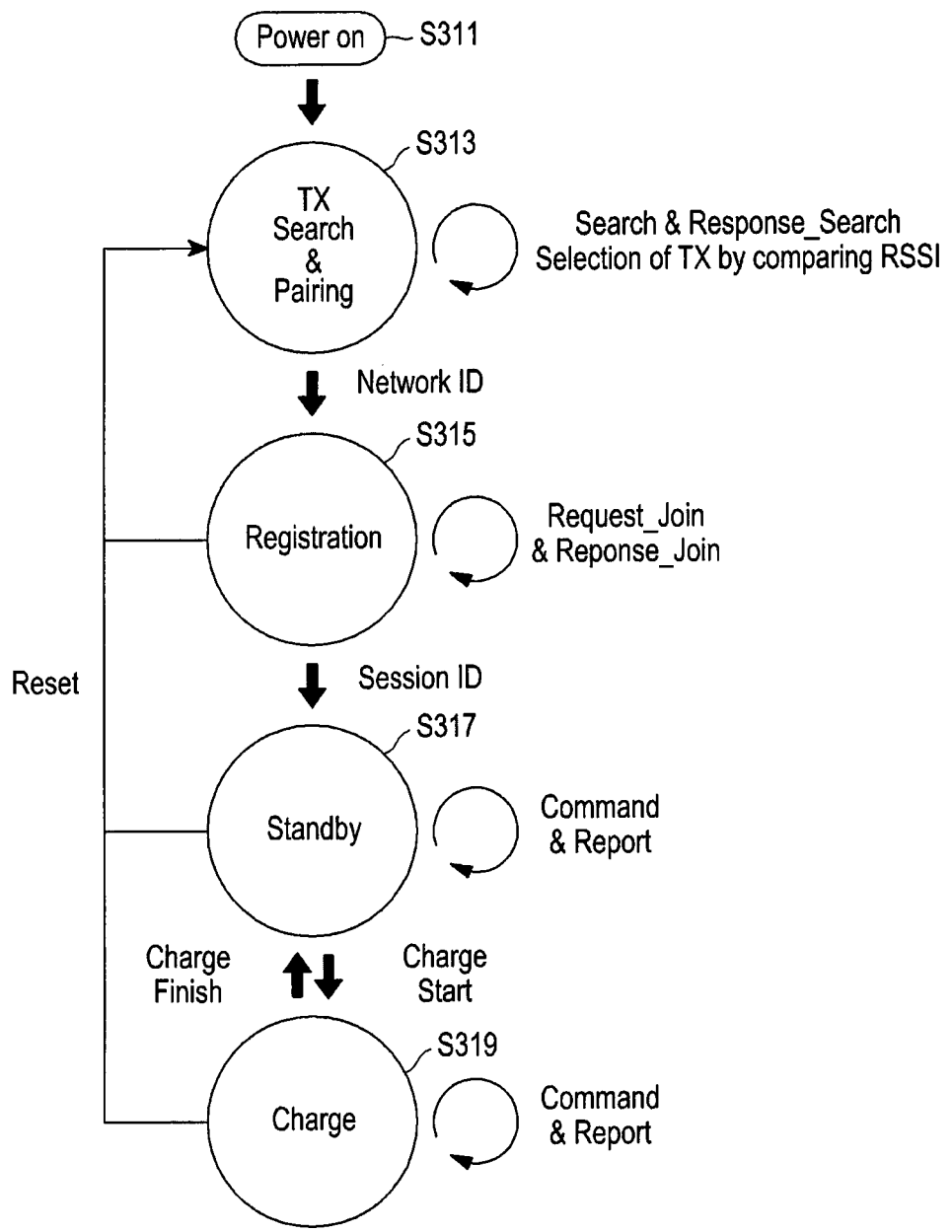
FIG. 4B is a flowchart illustrating a control method in a wireless power receiver according to another embodiment of the present invention.

FIG. 4B is a flowchart illustrating a control method in a wireless power receiver according to another embodiment of the present invention.

Referring to FIG. 4B, if a wireless power receiver 250 is powered-on or placed in the vicinity of wireless power transmitters in step S311, the wireless power receiver 250 searches for wireless power transmitters, and pairs with any one (e.g., power transmitter 200) of the searched wireless power transmitters, in step S313. The wireless power receiver 250 transmits a wireless power transmitter search signal to wireless power transmitters, and determines that the wireless power transmitter 200 as a searched wireless power transmitter based on a wireless power transmitter search response signal received in response thereto. The wireless power receiver 250 identifies each wireless power transmitter with a network ID of the wireless power transmitter.

Thereafter, in step S315, the wireless power receiver 250 joins the wireless power network controlled by the wireless power transmitter 200. For example, the wireless power receiver 250 may send a join request signal to the wireless power transmitter 200, and join the wireless power network based on a join response signal received in response thereto. If the wireless power receiver 250 joins the wireless power network controlled by the wireless power transmitter 200, the wireless power transmitter 200 may assign a session ID to the wireless power receiver 250.

In step S317, the wireless power receiver 250 maintains the standby state before charging. The wireless power receiver 250 receives a command signal from the wireless power transmitter 200, and sends a report signal in response thereto. Upon receiving a command signal including a charging command from the wireless power transmitter 200, the wireless power receiver 250 starts charging, in step S319. For example, the wireless power receiver 250 may perform charging by turning on the switching unit 256. If the charging of the wireless power receiver 250 is terminated, or if the transmission power is not sufficient to charge the capacity of the charging unit of the wireless power receiver, the wireless power transmitter 200 may control the wireless power receiver 250 to stay in the standby state. The wireless power receiver 250 is controlled such that it is required to enter the standby state before switching from the joining state (or registration state) to the charging state.

Figure 5A:
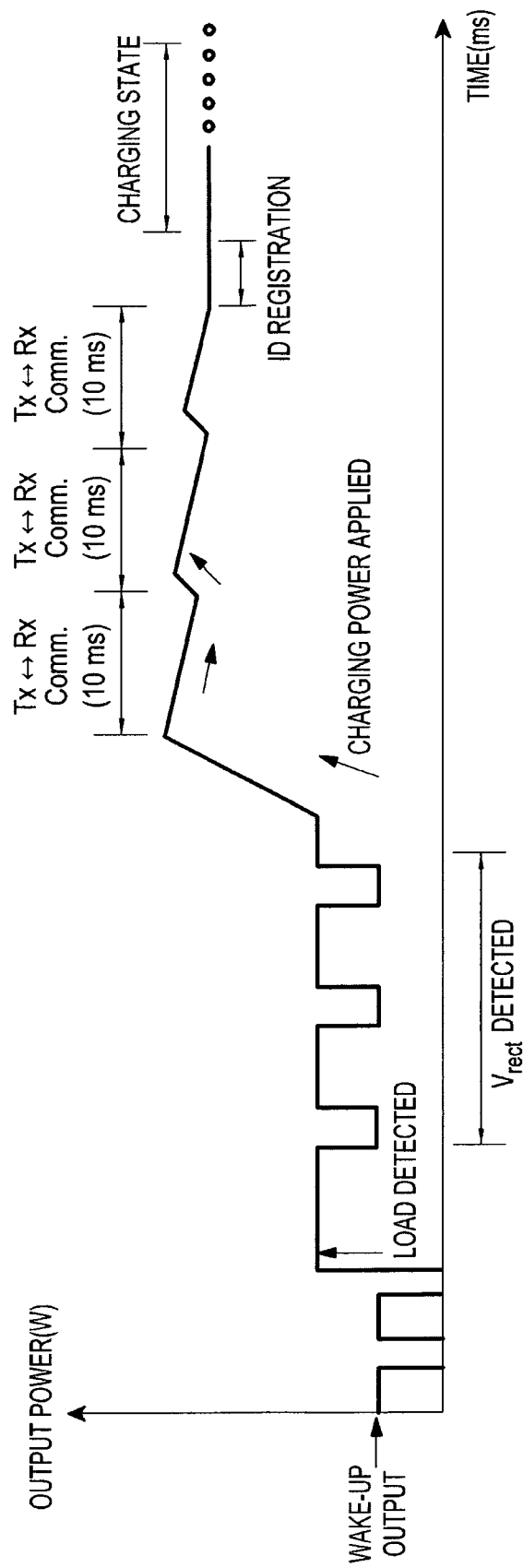
FIG. 5A is a power-time graph of power output by a wireless power transmitter according to an embodiment of the present invention.

FIG. 5A is a power-time graph of power output by a wireless power transmitter according to an embodiment of the present invention.

Referring to FIG. 5A, a wireless power transmitter applies detection power for load detection in an initial phase. The detection power has an amount of power with which the wireless power transmitter can detect a change in load due to the placement of a wireless power receiver. The wireless power transmitter applies the detection power at predetermined time intervals.

If a wireless power receiver is placed on or over the wireless power transmitter, the wireless power transmitter detects the change in load. The wireless power transmitter increases its applied power. The wireless power transmitter applies the driving power, which is the power with which the wireless power receiver can be driven. After applying the driving power, the wireless power transmitter forms a wireless communication network with the wireless power receiver and communicates with the wireless power receiver.

The wireless power transmitter receives a join request signal from the wireless power receiver. The join request signal has the frame structure illustrated in Table 4 below.

TABLE 4

| Frame Type | Sequence number | network ID | product ID | Vrect static Min | Vrect static Max | Vrect static high | Vrect Static Set | Vrect dynamic | typical output voltage | typical output current | power control algorithm preference |
|---|---|---|---|---|---|---|---|---|---|---|---|
| 1 | 1 | 1 | 4 | 2 | 2 | 2 | 2 | 2 | 1 | 1 | 1 |

The join request signal includes fields of 'Frame Type', 'Sequence Number', 'Network ID', 'Device ID', 'Minimum Voltage of Vrect' and 'Maximum Voltage of Vrect'. Vrect may be a voltage at a front end of the DC/DC converter. In addition, the join request signal may include a value of Vrect.

As described above, the join request signal includes voltage information of the wireless power receiver. Accordingly, the wireless power transmitter determines the voltage at, for example, the front end of the DC/DC converter in the wireless power receiver.

The wireless power transmitter changes the driving power, by increasing or decreasing the driving power. The wireless power transmitter may adjust the driving power in a predetermined pattern.

The wireless power transmitter compares the change in the driving power with the voltage information of the wireless power receiver. For example, if the driving power of the wireless power transmitter increases, the voltage of the wireless power receiver also increases. However, if the driving power of the wireless power transmitter decreases, the voltage of the wireless power receiver also decreases. In addition, if the driving power of the wireless power transmitter has a specific pattern, the voltage of the wireless power receiver will also have a pattern similar to the specific pattern. Alternatively, the voltage of the wireless power receiver may be deployed in a specific region based on the change in the driving power of the wireless power transmitter.

However, if the wireless power receiver and the wireless power transmitter are spaced apart from each other by more than a predetermined distance, the change in the driving power may not affect the voltage of the wireless power receiver. Accordingly, if the change in the driving power affects the voltage of the wireless power receiver, the wireless power transmitter will proceed with the join phase. However, if the change in the driving power does not affect the voltage of the wireless power receiver, the wireless power transmitter will not proceed with the join phase.

When the wireless power transmitter does not proceed with the join phase, the wireless power transmitter may send an error signal.

In the example of FIG. 5A, the wireless power transmitter may apply the driving power in a predetermined pattern in an initial phase, and increase or decrease the driving power in its succeeding phase.

Figure 5B:
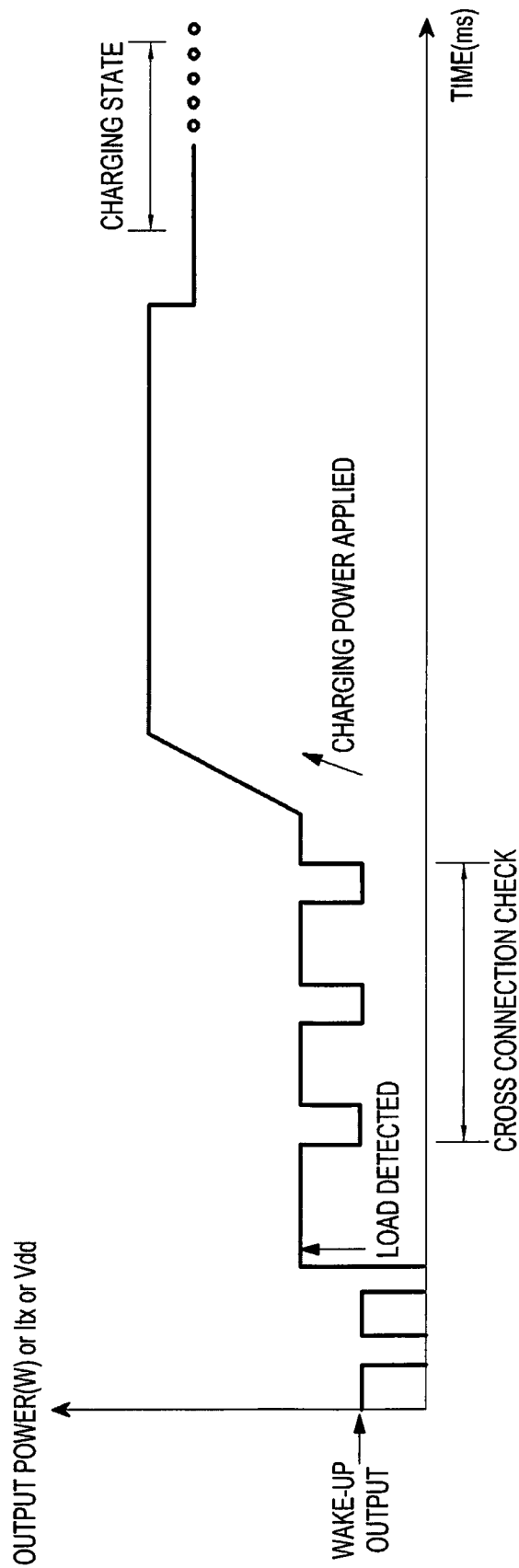
FIG. 5B is a power-time graph of power output by a wireless power transmitter according to an embodiment of the present invention.

FIG. 5B is a power-time graph of power output by a wireless power transmitter that determines whether a wireless power receiver is cross-connected thereto before the charging starts, according to an embodiment of the present invention.

Referring to FIG. 5B, after detecting a load, a wireless power transmitter 200 checks whether a wireless power receiver 250 is cross-connected thereto, before applying charging power. In the present example, after detecting the load, the wireless power transmitter 200 determines that the wireless power receiver 250 is cross-connected. Accordingly, the wireless power transmitter 200 checks whether a wireless power receiver is cross-connected thereto, in order to exclude the cross-connected wireless power receiver from its wireless power network.

To this end, the wireless power transmitter 200 transfers power, and then verifies the validity of the wireless power receiver 250 based on the measured voltage Vrect and/or measured current Irect, which correspond to the amount of the transmission power and are received from the wireless power receiver 250. The power transmission operation may include alternately repeatedly transferring first transmission power and second transmission power a predetermined number of times as illustrated in FIG. 5B, before it is determined whether the wireless power receiver is actually cross-connected. The first transmission power is different in level from the second transmission power. For example, the level of the first transmission power is the same as that measured when the load is detected, and the second transmission power is lower in level than the first transmission power. In addition to the transmission power, the wireless power transmitter 200 may adjust the current Ix of the resonant signal or the voltage Vdd from the power supply unit 20 similarly to the waveform illustrated in FIG. 5B, in determining whether the wireless power receiver is cross-connected thereto.

Before the charging starts, the wireless power transmitter 200 transfers power for its communication connection with the wireless power receiver 250. In this case, in determining the amount of its transmission power, the wireless power transmitter 200 may use the initial reference voltage and initial reference current provided from the wireless power receiver 250.

Figure 6:
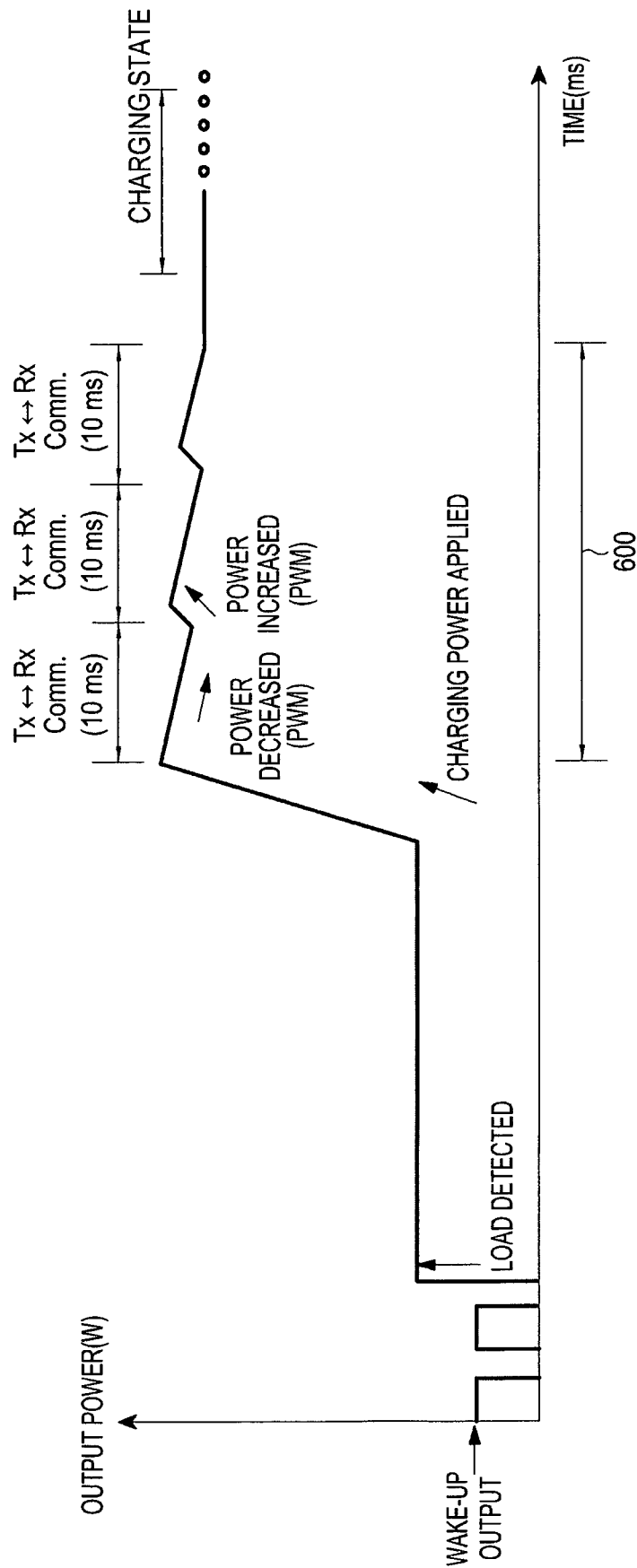
FIG. 6 is a power-time graph of power output by a wireless power transmitter according to an embodiment of the present invention.

FIG. 6 is a power-time graph of power output by a wireless power transmitter that determines whether a wireless power receiver is cross-connected thereto while the charging is underway, according to an embodiment of the present invention.

As illustrated in FIG. 6, the wireless power transmitter may increase or decrease the driving power without any set pattern. Specifically, referring to FIG. 6, after applying the charging power, the wireless power transmitter changes the amount of the transmission power by decreasing or increasing the transmission power. In order to determine the level by which the wireless power transmitter should increase the charging power when applying the charging power, the wireless power transmitter may use the initial reference voltage and initial reference current provided from the wireless power receiver 250. Thereafter, the measured voltage Vrect and measured current Irect at the wireless power receiver 250, which correspond to the changed amount of the transmission power, are carried on a report frame which is received from the wireless power receiver 250 and used to report the charging situation, after the charging starts.

For example, if the wireless power transmitter 200 decreases its transmission power, the measured voltage Vrect and measured current Irect at the wireless power receiver 250 will also decrease to correspond to the transmission power. Similarly, if the wireless power transmitter 200 increases its transmission power, the measured voltage Vrect and measured current Irect at the wireless power receiver 250 will also increase to correspond to the transmission power. If the measured voltage Vrect and measured current Irect have not changed to correspond to the transmission power, the wireless power transmitter 200 terminates its communication connection to the wireless power receiver 250, upon determining that the wireless power receiver 250 is not a valid wireless power receiver.

However, if a level of the measured voltage Vrect and measured current Irect, which have changed to correspond to the transmission power, does not fall within a valid range, the wireless power transmitter 200 determines that the wireless power receiver 250 is a valid wireless power receiver. By performing this determination, the wireless power transmitter 200 maintains its connection only to the valid wireless power receiver, thereby preventing the cross connection.

Figure 7:
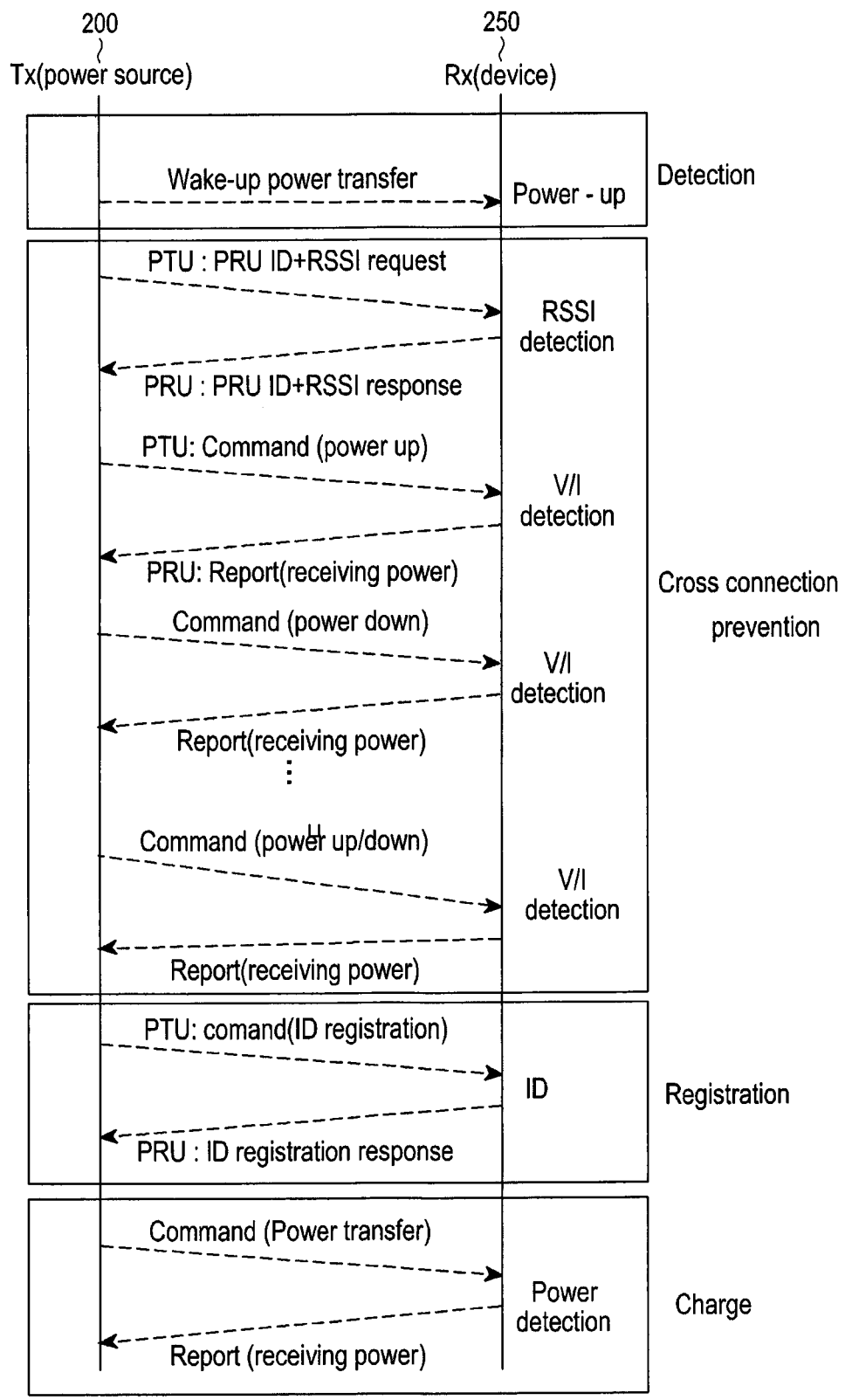
FIG. 7 is a diagram illustrating signal transmission/reception between a wireless power transmitter and a wireless power receiver according to an embodiment of the present invention.

FIG. 7 is a diagram illustrating signal transmission/reception between a wireless power transmitter and a wireless power receiver according to an embodiment of the present invention.

As illustrated in FIG. 7, to resolve the cross connection problem may be added after a detection step and before a join or registration step.

The wireless power transmitter 200 may change its applied power before the join step. In addition, the wireless power transmitter may command the wireless power receiver to transmit its voltage information. The wireless power receiver 250 transmits its voltage information to the wireless power transmitter in response to the command. The wireless power transmitter 200 compares the received voltage information of the wireless power receiver 250 with the change in its applied power. The wireless power transmitter 200 determines whether to join the wireless power receiver in its wireless power network, based on the comparison results. For example, if the voltage of the wireless power receiver 250 changes to correspond to the change in the power of the wireless power transmitter 200, the wireless power transmitter 200 joins the wireless power receiver in its wireless power network. However, if the voltage of the wireless power receiver 250 does not change to correspond to the change in the power of the wireless power transmitter 200, the wireless power transmitter 200 does not join the wireless power receiver in its wireless power network.

Figure 8:
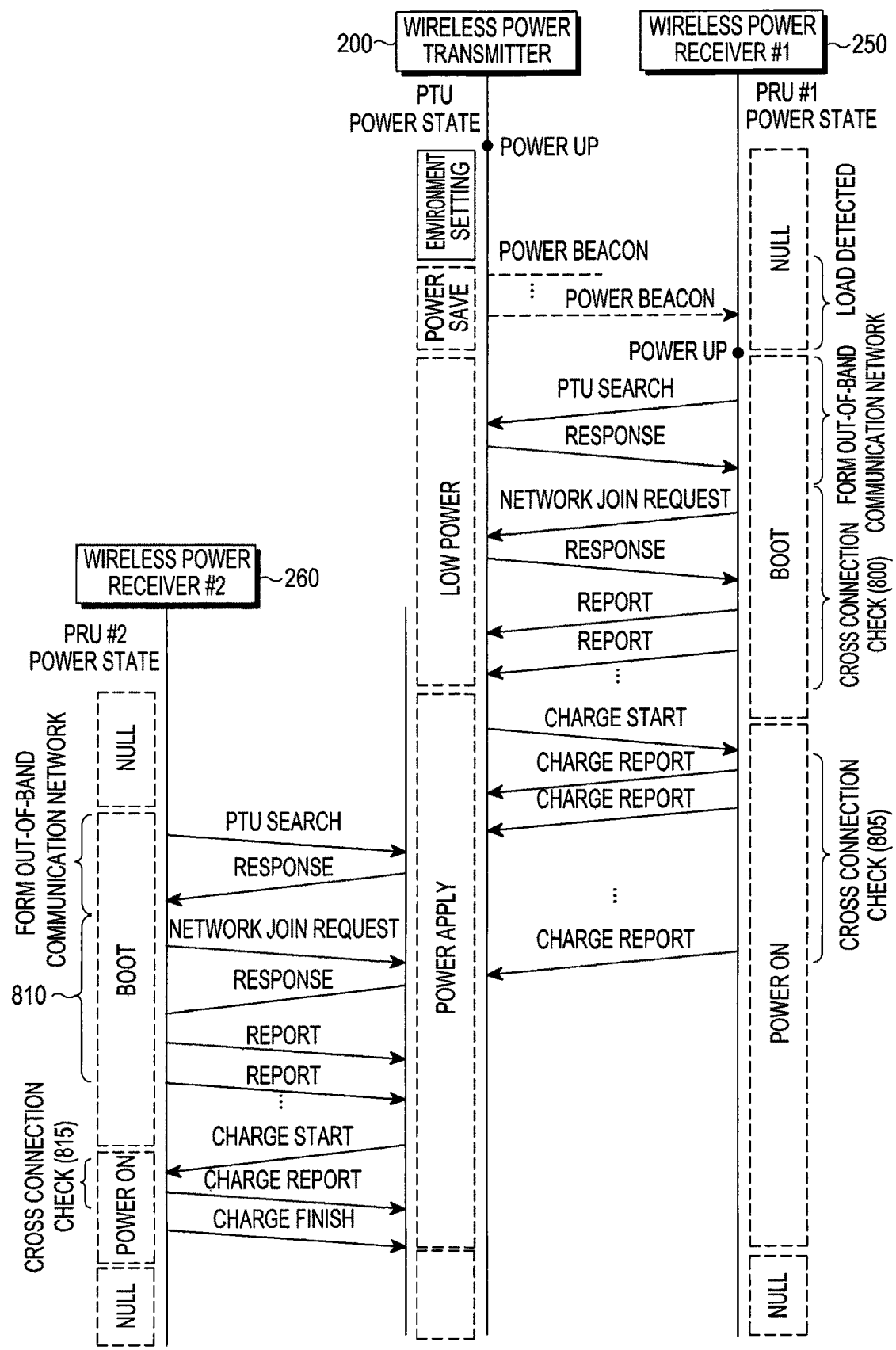
FIG. 8 is a diagram illustrating signal transmission/reception between a wireless power transmitter and multiple wireless power receivers according to another embodiment of the present invention.

FIG. 8 is a diagram illustrating signal transmission/reception between a wireless power transmitter and multiple wireless power receivers according to another embodiment of the present invention.

As illustrated in FIG. 8, during or after forming a network with a first wireless power receiver 250 (i.e., at a state 800 before the charging starts), a wireless power transmitter 200 checks whether the first wireless power receiver 250 is cross-checked thereto, based on the report frame which is received from the first wireless power receiver 250 and includes power status information. Alternatively, after informing the first wireless power receiver 250 of the start of charging (i.e., at a state 805 where the charging is underway), the wireless power transmitter 200 may perform the cross-connection check operation based on the report frame including the power status information indicating the charging situation of the first wireless power receiver 250. Multiple wireless power receivers may be placed on or over the charging pad of the wireless power transmitter 200. Even when multiple wireless power receivers are present, at the state 810 before the charging starts, or at the state 815 where the charging is underway, after adjusting the amount of transmission power to a second wireless power receiver 260, the wireless power transmitter 200 may perform the cross connection check operation based on the report frame that is received from the second wireless power receiver 260 and includes its power status information.

The configuration for changing the level of transmission power in the cross connection check method has been described so far. In an alternative embodiment of the present invention, a wireless power transmitter may determine, as a wireless power receiver to be connected thereto, the wireless power receiver from which the wireless power transmitter has received a signal within a predetermined time, after detecting a change in load. The wireless power transmitter may receive, for example, a wireless Power Transmitter Unit (PTU) searching signal from wireless power receivers. The wireless power transmitter may determine, as a wireless power receiver to be connected thereto, the wireless power receiver from which the wireless power transmitter has received a PTU searching signal within a predetermined time, after detecting a change in load. The wireless power transmitter may determine, as a cross-connected wireless power receiver, the wireless power receiver from which the wireless power transmitter has received a PTU searching signal after a lapse of a predetermined time, after detecting the change in load, and may release its communication connection. The wireless power transmitter may release its communication connection even when it detects no change in load.

Although, in the examples of the foregoing description, a wireless power transmitter receives a PTU searching signal within a predetermined time after detecting a change in load, the wireless power transmitter may change its operation order in the same cross connection check method, such as detecting a change in load within a predetermined time after receiving a PTU searching signal.

When using a small-sized wireless power receiver or a device having low power consumption, the wireless power transmitter may be unable to detect a change in load of the wireless power receiver. In this case, the wireless power receiver may provide additional information during its communication with the wireless power transmitter, allowing the wireless power transmitter to determine a wireless power receiver to be connected thereto by detecting a change in load. The additional information may include at least one of power consumption of the wireless power receiver, category information of the wireless power receiver which is classified depending on its size, and information indicating whether the wireless power transmitter can detect a change in load of the wireless power receiver.

More specifically, upon receiving a PTU searching signal of a wireless power receiver, a wireless power transmitter recognizes category information of the wireless power receiver, which is included in the PTU searching signal. The category information may have at least one of Category 1 to Category 5 depending on the type of the wireless power receiver, as shown in Table 5 below.

TABLE 5

| Category of wireless power receiver | Type of wireless power receiver |
|---|---|
| Category 1 | Bluetooth headset |
| Category 2 | Feature phone |
| Category 3 | Smart phone |
| Category 4 | Tablet computer |
| Category 5 | Laptop computer |

If the recognized category information indicates any of Category 2 to Category 5, the wireless power transmitter determines whether it has received the PTU searching signal after detecting the change in load or within a predetermined time, determining that the wireless power transmitter can detect a change in load for the categories, and determines that the related wireless power receiver as a wireless power receiver to be connected thereto. If the wireless power transmitter has received the PTU searching signal within a predetermined time, the wireless power transmitter will communicate with the related wireless power receiver. In addition, if the wireless power transmitter has not detected any change in load or has detected a change in load after a lapse of predetermined time, the wireless power transmitter releases communication with the wireless power receiver, and determines that the wireless power receiver is not a wireless power receiver to be connected to the wireless power transmitter.

However, if the category information recognized by the wireless power transmitter corresponds to Category 1, the wireless power transmitter communicates with the related wireless power receiver regardless of whether the wireless power transmitter has detected the change in load of the wireless power receiver, and determines that the wireless power transmitter is unable to detect a change in load of the wireless power receiver.

As to the category information or the criteria for determining whether the wireless power transmitter can detect a change in load, the category may be set in advance in the wireless power transmitter, or the wireless power transmitter may receive the criteria from the wireless power receiver by communication.

Although foregoing examples, the wireless power transmitter determines a wireless power receiver to be connected thereto based on the category of the wireless power receiver, the wireless power transmitter may use a table illustrated in Table 6 below, as the criteria for determining a wireless power receiver to be connected thereto, regardless of the category, in accordance with embodiments of the present invention.

Specifically, upon receiving a PTU searching signal of a wireless power receiver, a wireless power transmitter detects load detection indication bit information of the wireless power receiver, which is included in the PTU searching signal. The load detection indication bit information may have a 3-bit value such as '000', '001', '010', '011', '100', '101', depending on the type of the wireless power receiver, as shown in Table 6 below.

TABLE 6

| Load detection indication bits | Type of wireless power receiver |
|---|---|
| 000 | Device, a change in load of which cannot be detected |
| 001 | Wireless power receiver in Category 1 (for example, Bluetooth headset) |

TABLE 6-continued

| Load detection indication bits | Type of wireless power receiver |
| --- | --- |
| 010 | Wireless power receiver in Category 2 (for example, feature phone) |
| 011 | Wireless power receiver in Category 3 (for example, smart phone) |
| 100 | Wireless power receiver in Category 4 (for example, tablet computer) |
| 101 | Wireless power receiver in Category 5 (for example, laptop computer) |

For example, the load detection indication bits '000' indicate a device for which a change in load cannot be detected by the wireless power transmitter, regardless of the category of the wireless power receiver. Therefore, even for a smart phone (or wireless power receiver) whose category information is 3 (i.e., bit sequence '011'), if its load detection indication bits included in the PTU searching signal are '000', the wireless power transmitter will end communication with the smart phone, upon determining that the smart phone is not a wireless power receiver to be connected thereto.

The foregoing examples are merely provided to illustrate principles of embodiments of the present invention, and wireless power transmitters according to embodiments of the present invention may exclude the cross-connected wireless power receiver from its wireless power network even in the charging phase. For example, the wireless power transmitter may change its charging power, and may compare the corresponding voltage information of the wireless power receiver with the change in the charging power to determine whether to keep the join of the wireless power receiver in the wireless power network.

As described above, a wireless power transmitter according to embodiments of the present invention may exclude the cross-connected wireless power receiver from its wireless power network before the cross-connected wireless power receiver joins the wireless power network.

As is apparent form the foregoing description, the wireless power transmitter according to embodiments of the present invention checks whether a wireless power receiver is cross-connected thereto, before the charging starts or while the charging is underway, thereby ensuring the stability in the multi-power transmission system including multiple wireless power receivers. In addition, even though multiple wireless power receivers are placed very close to a wireless power transmitter, the wireless power transmitter charges only the wireless power receiver whose power changes to correspond to the power control of the wireless power transmitter, thereby making it possible to stably supply power. In other words, according to embodiments of the present invention, a wireless power transmitter may transfer power to and perform data communication with only the wireless power receiver that operates under instruction of the wireless power transmitter, thereby preventing damage to the device due to the foreign objects.

Besides, a wireless power receiver according to embodiments of the present invention may also request a wireless power transmitter to transfer its desired power to receive it from the wireless power transmitter, and then determine the reliability of the wireless power transmitter based on the power which is changed in response to the request, thereby preventing the cross-connection.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for controlling a wireless power transmitter, the method comprising:
   applying a detection power for detecting a change in a load of the wireless power transmitter;
   detecting the change in the load of the wireless power transmitter;
   receiving a first signal comprising load detection indication bits from an electronic device within a preset time after detecting the change in the load;
   determining whether the electronic device is capable of generating the change in the load of the wireless power transmitter based on the load detection indication bits;
   in response to determining that the electronic device is capable of generating the change in the load based on the load detection indication bits, transmitting a second signal corresponding to the first signal; and
   in response to determining that the electronic device is not capable of generating the change in the load based on the load detection indication bits, stopping a communication with the electronic device.

2. The method of claim 1, wherein the load detection indication bits is one of 000, 001, 010, 011, 100 and 101.

3. The method of claim 2, further comprising:
   based on the load detection indication bits being 000, determining that the change in the load of the wireless power transmitter cannot be detected even though the electronic device is placed within a charging area of the wireless power transmitter.

4. The method of claim 2, further comprising:
   based on the load detection indication bits being 001, determining that a category of the electronic device is category 1;
   based on the load detection indication bits being 010, determining that the category of the electronic device is category 2;
   based on the load detection indication bits being 011, determining that the category of the electronic device is category 3;
   based on the load detection indication bits being 100, determining that the category of the electronic device is category 4; and
   based on the load detection indication bits being 101, determining that the category of the electronic device is category 5.

5. A wireless power transmitter, comprising:
   a resonator;
   a wireless communication unit; and
   a controller configured to:
      control the wireless power transmitter to apply a detection power for detecting a change in a load of the wireless power transmitter to the resonator,
      detect the change in the load of the wireless power transmitter,
      receive, through the wireless communication unit, a first signal comprising load detection indication bits from an electronic device within a preset time after detecting the change in the load,
      determine whether the electronic device is capable of generating the change in the load of the wireless power transmitter based on the load detection indication bits;
      in response to determining that the electronic device is capable of generating the change in the load based on the load detection indication bits, transmit, through the wireless communication unit, a second signal corresponding to the first signal; and in response to determining that the electronic device is not capable of generating the change in the load based on the load detection indication bits, stop a communication with the electronic device.

6. The wireless power transmitter of claim 5, wherein the load detection indication bits is one of 000, 001, 010, 011, 100 and 101.

7. The wireless power transmitter of claim 6, wherein the controller is further configured to determine that the change in the load of the wireless power transmitter cannot be detected even though the electronic device is placed within a charging area of the wireless power transmitter, based on the load detection indication bits being 000.

8. The wireless power transmitter of claim 6, wherein the controller is further configured to determine that a category of the electronic device is category 1 based on the load detection indication bits being 001, or determine that the category of the electronic device is category 2 based on the load detection indication bits being 010, or, determine that the category of the electronic device is category 3, based on the load detection indication bits being 011, or determine that the category of the electronic device is category 4 based on the load detection indication bits being 100, or determine that the category of the electronic device is category 5 based on the load detection indication bits being 101.

9. A wireless power transmitter, comprising:
a resonator;
a wireless communication unit; and
a controller configured to:
apply a detection power for detecting a change in a load of the wireless power transmitter to the resonator,
detect the change in the load of the wireless power transmitter,
receive, through the wireless communication unit, a first signal comprising load detection indication bits from an electronic device within a preset time after detecting the change in the load,
determine that the electronic device is not capable of generating the change in the load of the wireless power transmitter based on the load detection indication bits, and
in response to determining that the electronic device is not capable of generating the change in the load of the wireless power transmitter based on the load detection indication bits, determine that the electronic device is not a wireless power receiver to be connected.

10. The method of claim 2, further comprising determining that the electronic device is capable of generating the change in the load of the wireless power transmitter based on the load detection indication bits being one of values other than 000.

11. The wireless power transmitter of claim 6, wherein the controller is configured to determine that the electronic device is capable of generating the change in the load of the wireless power transmitter based on the load detection indication bits being one of values other than 000.

* * * * *